Aug. 15, 1944.                K. SCHÄFER                 2,356,008
                              VEHICLE BODY
                           Filed Nov. 15, 1940
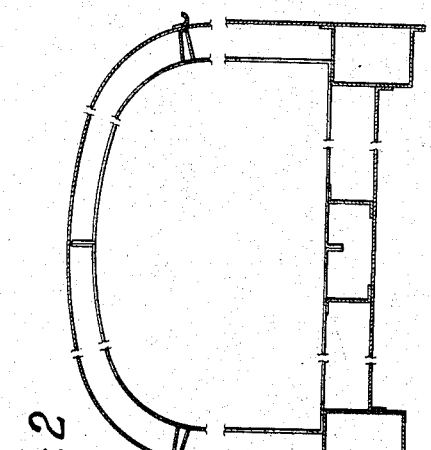
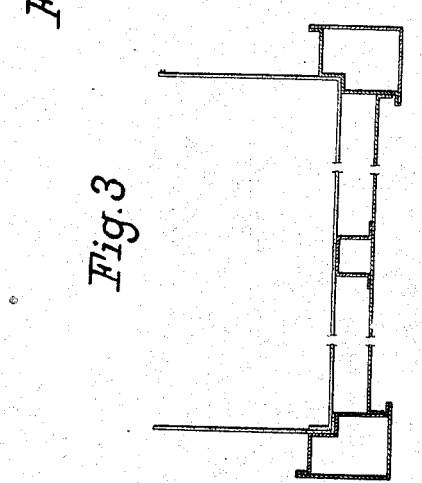
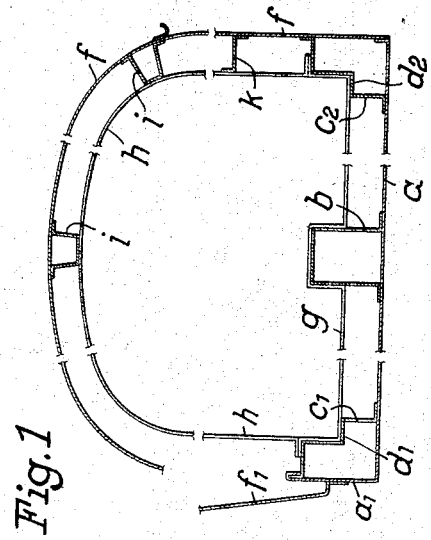
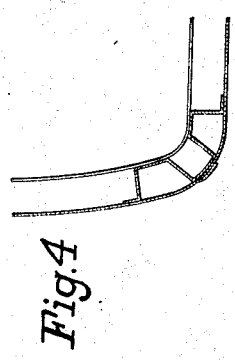
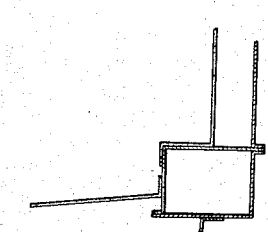
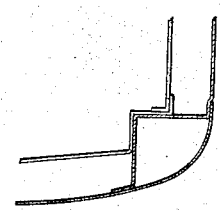
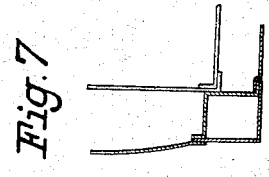
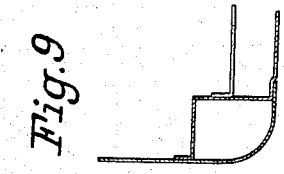
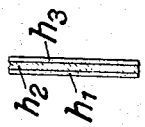
Inventor:
Kurt Schäfer
By John P. Tarbox
   Attorney Patented Aug. 15, 1944

2,356,008

UNITED STATES PATENT OFFICE 2,356,008

VEHICLE BODY

Kurt Schäfer, Berlin-Eichkamp, Germany, assignor to Edward G. Budd Manufacturing Company, Philadelphia, Pa.

Application November 15, 1940, Serial No. 365,755
In Germany December 13, 1939

2 Claims. (Cl. 296—31)

Heretofore the bodies of passenger vehicles such as automobiles, in particular of smaller passenger automobiles the outer skin of which is pressed from sheet metal are if they have double walls throughout provided with interior panels also pressed from sheet metal. Bodies of that kind require mostly a separate interior padding or upholstery, especially where the occupants would come in contact with the interior panel.

According to the present invention, the outer panel is to be pressed, now as before, from solid sheet metal, whereas the inner panel consists entirely of structural synthetic material of poor thermal conductivity, the synthetic material being of such nature as to adapt it for performing load carrying functions, and the construction being such that both said panels constitute together main load carrying members of the structure. Such a composite structure results in the saving of weight. A further advantage is that the walls feel pleasant in the winter, while in the summer the heat will be kept away from the interior space to a great extent.

The accompanying drawing shows the invention by way of example in which:

Fig. 1 is a vertical partial section through a car body according to the invention the right hand side of which is of a slightly different design than the left hand side.

Figure 2 is a similar section through another embodiment of invention.

Fig. 3 is another vertical section through the lower portion of another embodiment of invention.

Figs. 4 to 9 are a section each through longitudinal edges of a modified design of a car body.

Fig. 10 is a section through one design of an interior panel according to the invention.

In the drawing is $a$ a sheet metal bottom panel on which are placed in the center a longitudinal girder $b$ of sheet metal and at the sides two further longitudinal girders $c_1$, $c_2$ equipped with steps $d_1$, $d_2$. These longitudinal girders $c_1$, $c_2$ are connected with the bottom $a$ and one side panel $f$ respectively. On the left hand side, this longitudinal girder $c_1$ is closed by the marginal part and a flange $a_1$ of the bottom panel $a$, on the right hand side the girder $c_2$ is closed by the marginal parts of the bottom panel $a$ and the side panel $f$. On the left, the side panel $f_1$ is secured to the flange $a_1$ of the floor panel. $g$ is a bottom consisting of synthetic material. $h$ is an upper wall panel likewise of synthetic material which, as shown in Fig. 10 on a larger scale, may consist of several layers $h_1$, $h_2$, $h_3$. Spacers $i$, $k$ which may consist of either sheet metal or synthetic material are provided between the exterior panel $f$ and interior panel $h$.

According to the invention, at least the interior panels of the passenger room where persons come in contact with the interior panel consists of synthetic material of poor thermal conductivity. Preferably this may also apply to the place where the engine is situated, so as to prevent the heat of the engine from penetrating into the passenger room of the car, or so as to protect the water-bearing parts of the engine from cold.

I claim:

1. In a passenger vehicle body such as an automobile body, a wall comprising an outer panel and an inner panel spaced from each other, said outer panel consisting entirely of sheet metal, said inner panel consisting entirely of synthetic structural material of poor thermal conductivity, the material of said inner panel being such as to adapt it to perform load carrying functions and the construction of the body being such that the sheet metal panel and the panel of synthetic material constitute together main load carrying elements of the body.

2. In a vehicle according to claim 1, said inner panel consisting entirely of a multilayered synthetic structural material.

KURT SCHÄFER.